United States Patent
Chiou et al.

(10) Patent No.: US 8,442,577 B2
(45) Date of Patent: May 14, 2013

(54) WIRELESS COMMUNICATION APPARATUS WITH AN ANTENNA SHARED BETWEEN A PLURALITY OF COMMUNICATION CIRCUITS

(75) Inventors: Hsien-Chyi Chiou, Hsinchu (TW); Ming-Hao Yeh, Taipei (TW)

(73) Assignee: Mediatek Inc., Hsin-Chu (TW)

( * ) Notice: Subject to any disclaimer, the term of this patent is extended or adjusted under 35 U.S.C. 154(b) by 217 days.

(21) Appl. No.: 12/963,607

(22) Filed: Dec. 8, 2010

(65) Prior Publication Data

US 2011/0244917 A1  Oct. 6, 2011

Related U.S. Application Data

(60) Provisional application No. 61/318,834, filed on Mar. 30, 2010.

(51) Int. Cl.
*H04M 1/00* (2006.01)
*H04B 1/38* (2006.01)
*H01Q 9/00* (2006.01)

(52) U.S. Cl.
USPC ............. 455/550.1; 455/552.1; 455/143; 455/434; 455/554.2; 455/90.2; 343/749

(58) Field of Classification Search ......... 455/550.1, 455/552.1, 143, 434, 554.2, 90.2; 343/749
See application file for complete search history.

(56) References Cited

U.S. PATENT DOCUMENTS

| 2006/0084383 A1* | 4/2006 | Ibrahim et al. ............... 455/41.2 |
| 2010/0124891 A1* | 5/2010 | Lin et al. .................. 455/143 |
| 2010/0277383 A1* | 11/2010 | Autti et al. ................. 343/749 |

FOREIGN PATENT DOCUMENTS

| CN | 1622480 A | 6/2005 |
| CN | 200994180 Y | 12/2007 |

OTHER PUBLICATIONS

International application No. PCT/CN2011/070482, International filing date:Jan. 21, 2011, International Searching Report mailing date: Apr. 28, 2011.

\* cited by examiner

*Primary Examiner* — Christopher M Brandt
*Assistant Examiner* — Muthuswamy Manoharan
(74) *Attorney, Agent, or Firm* — Winston Hsu; Scott Margo (57) ABSTRACT

An exemplary wireless communication apparatus includes a first communication circuit, a second communication circuit, an antenna, and a combiner. The first communication circuit is arranged to process signals according to a first wireless communication protocol working at a first frequency band. The second communication circuit is arranged to process signals according to a second wireless communication protocol working at a first frequency band, wherein the second wireless communication protocol is different from the first wireless communication protocol. The antenna is shared between the first communication circuit and the second communication circuit. The combiner has a first port coupled to the first communication circuit, a second port coupled to the second communication circuit, and a third port coupled to the antenna. In addition, the combiner provides a first signal path between the third port and the first port and a second signal path between the third port and the second port.

8 Claims, 5 Drawing Sheets

FM short antenna (FPC type)

(B)

BT metal antenna (PIFA type)

(C)

GSM metal antenna

FIG. 5

WIRELESS COMMUNICATION APPARATUS WITH AN ANTENNA SHARED BETWEEN A PLURALITY OF COMMUNICATION CIRCUITS

CROSS REFERENCE TO RELATED APPLICATIONS

This application claims the benefit of U.S. Provisional Application No. 61/318,834, filed on Mar. 30, 2010 and incorporated herein by reference.

BACKGROUND

The disclosed embodiments of the present invention relate to transmitting/receiving signals via an antenna, and more particularly, to a wireless communication apparatus with an antenna shared between a plurality of communication circuits which operate according to different wireless communication protocols/impedance matching requirements/frequency bands.

With the development of a mobile communication device, more and more functions are integrated therein. For example, a cellular phone, such as a smart phone, may support a plurality of communication protocols such as a Global System for Mobile Communications (GSM) protocol, a Bluetooth (BT) protocol, a frequency modulation (FM) broadcast protocol, etc. Regarding the FM radio reception, an external headphone connected to a cellular phone is required to serve as an FM long antenna; otherwise, the FM radio function may not work as desired. That is, if the user has no headphone at hand, the user can not listen to the FM radio broadcast due to the absence of the required FM antenna. Such a conventional design is not user-friendly. To solve this problem, a cellular phone may be configured to have an FM short antenna embedded therein. However, this requires higher circuit area and production cost.

Thus, there is a need for an innovative wireless communication apparatus design which can share an antenna between different communication operations to thereby reduce the circuit area and production cost.

SUMMARY

In accordance with exemplary embodiments of the present invention, a wireless communication apparatus with an antenna shared between a plurality of communication circuits which operate according to different wireless communication protocols/impedance matching requirements/frequency bands is proposed to solve the above-mentioned problem.

According to a first aspect of the present invention, an exemplary wireless communication apparatus is proposed. The exemplary wireless communication apparatus includes a first communication circuit, a second communication circuit, an antenna, and a combiner. The first communication circuit is arranged to process signals according to a first wireless communication protocol working at a first frequency band. The second communication circuit is arranged to process signals according to a second wireless communication protocol working at a second frequency band, wherein the second wireless communication protocol is different from the first wireless communication protocol. The antenna is shared between the first communication circuit and the second communication circuit. The combiner has a first port coupled to the first communication circuit, a second port coupled to the second communication circuit, and a third port coupled to the antenna. In addition, the combiner includes a first blocking element placed between the third port and the first port for allowing signal components in the first frequency band to pass therethrough and for blocking or attenuating signal components in the second frequency band to provide a first signal path between the third port and the first port and a second blocking element placed between the third port and the second port for allowing the signal components in the second frequency band to pass therethrough and for blocking or attenuating the signal components in the first frequency band to provide a second signal path between the third port and the second port.

According to a second aspect of the present invention, an exemplary wireless communication apparatus is proposed. The exemplary wireless communication apparatus includes a first communication circuit, a second communication circuit, an antenna, and a combiner. The first communication circuit is arranged to perform a first communication operation under an impedance matching requirement of a first impedance value. The second communication circuit is arranged to perform a second communication operation under an impedance matching requirement of a second impedance value, wherein the second impedance value is around 50Ω and the first impedance value is higher than the second impedance value. The antenna is shared between the first communication circuit and the second communication circuit. The combiner has a first port coupled to the first communication circuit, a second port coupled to the second communication circuit, and a third port coupled to the antenna. In addition, the combiner provides a first signal path between the first port and the third port and a second signal path between the second port and the third port.

According to a third aspect of the present invention, an exemplary wireless communication apparatus is proposed. The exemplary wireless communication apparatus a first communication circuit, a second communication circuit, an antenna, and a combiner. The first communication circuit is arranged to process signal components in a first frequency band. The second communication circuit is arranged to process signal components in a second frequency band, wherein the second frequency band does not overlap the first frequency band. The antenna is shared between the first communication circuit and the second communication circuit. The combiner has a first port coupled to the first communication circuit, a second port coupled to the second communication circuit, and a third port coupled to the antenna. In addition, the combiner provides a first signal path between the first port and the third port and a second signal path between the second port and the third port.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the description and following claims to refer to particular components. As one skilled in the art will appreciate, manufacturers may refer to a component by different names. This document does not intend to distinguish between components that differ in name but not function. In the following description and in the claims, the terms "include" and "comprise" are used in an open-ended fashion, and thus should be interpreted to mean "include, but not limited to . . . ". Also, the term "couple" is intended to mean either an indirect or direct electrical connection. Accordingly, if one device is coupled to another device, that connection may be through a direct electrical connection, or through an indirect electrical connection via other devices and connections.

The conception of the present invention is to share a single antenna between different communication operations for saving the antenna are and the production cost. Please refer to FIG. 1, which is a diagram illustrating a generalized wireless communication apparatus according to an exemplary embodiment of the present invention. The exemplary wireless communication apparatus includes, but is not limited to, an antenna 102, a combiner 104, and a chip 105 having a first communication circuit 106 and a second communication circuit 108 implemented therein. The combiner 104 has a first port P1 coupled to the first communication circuit 106 via a pin 110 of the chip 105, a second port P2 coupled to the second communication circuit 108 via another pin 112 of the chip 105, and a third port P3 coupled to the antenna 102. The combiner 104 is implemented for providing a first signal path 114 between the third port P3 and the first port P1 and a second signal path 116 between the third port P3 and the second port P2, wherein each of the first signal path 114 and the second signal path 116 is allowed to have circuit element(s) disposed thereon according to actual design consideration. As can be seen from FIG. 1, the same antenna 102 is shared between the first communication circuit 106 and the second communication circuit 108 through the combiner 104.

Figure 1:
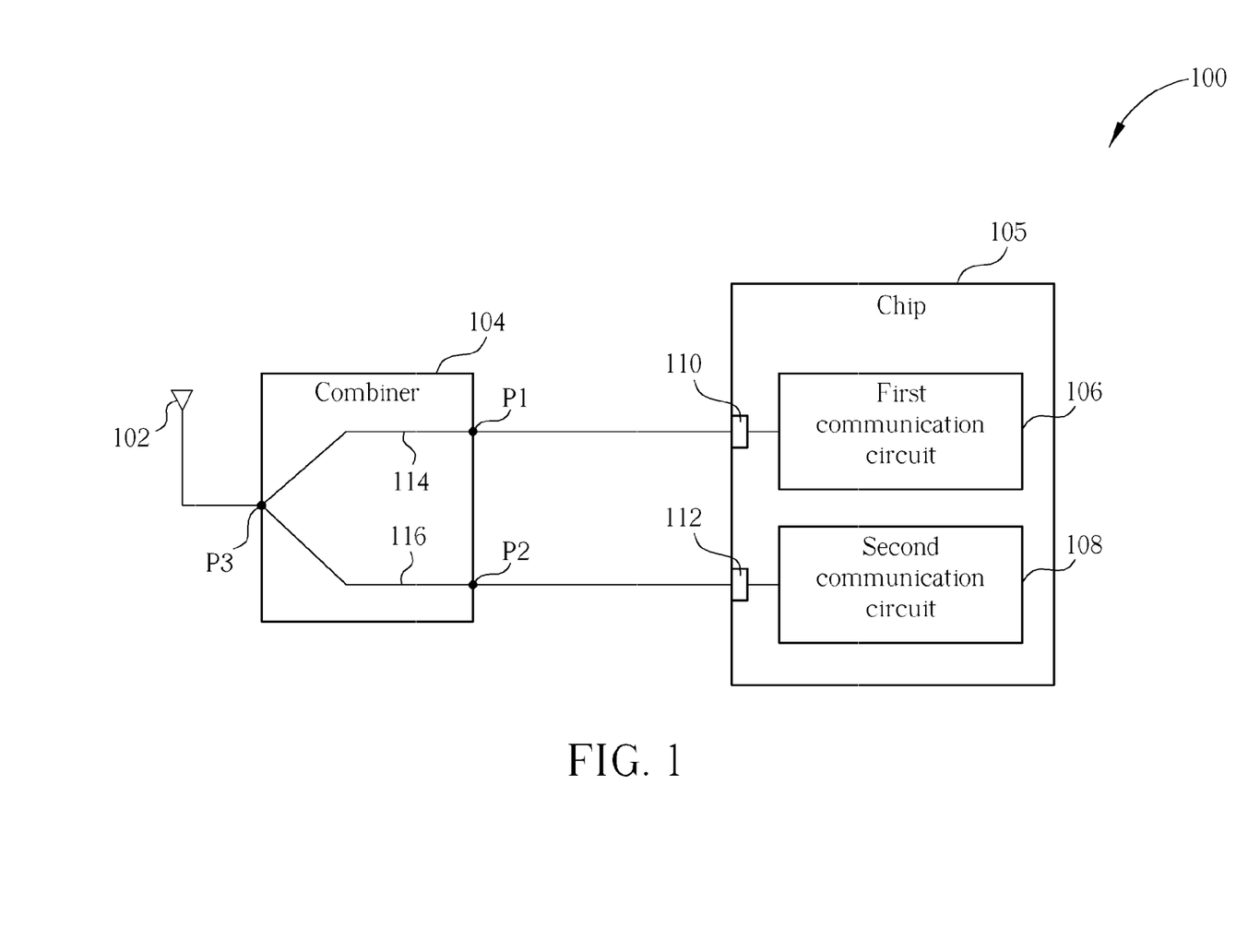
FIG. 1 is a diagram illustrating a generalized wireless communication apparatus according to an exemplary embodiment of the present invention.

In a first exemplary implementation, the first communication circuit 106 is arranged to process signals according to a first wireless communication protocol working at a first frequency band, and the second communication circuit 108 is arranged to process signals according to a second wireless communication protocol working at a second frequency band, wherein the second frequency band is different from the first wireless communication protocol. By way of example, but not limitation, the first wireless communication protocol may comply with one of a Bluetooth (BT) specification, a Wireless Local Area Network (WLAN) specification, Worldwide Interoperability for Microwave Access (WIMAX) specification, a Global System for Mobile Communications (GSM) specification, a Global Navigation Satellite Systems (GNSS) specification (e.g., a Global Positioning System (GPS) specification), a Wideband Code Division Multiple Access (WCDMA) specification, and a Digital Video Broadcasting (DVB) specification; in addition, the second wireless communication protocol may comply with a frequency modulation (FM) broadcast specification.

In a second exemplary implementation, the first communication circuit 106 is arranged to perform a first communication operation under an impedance matching requirement of a first impedance value (e.g., the first impedance value is around 50Ω), and the second communication circuit 108 is arranged to perform a second communication operation under an impedance matching requirement of a second impedance value, wherein the second impedance value is different from the first impedance value (e.g., the second impedance value is higher than the first impedance value). By way of example, but not limitation, the first impedance value may comply with one of the BT specification, the WLAN specification, the WIMAX specification, the GSM specification, the GNSS specification (e.g., the GPS specification), the WCDMA specification, and the DVB specification; in addition, the second impedance value may comply with the FM broadcast specification.

In a third exemplary implementation, the first communication circuit 106 is arranged to process signal components in a first frequency band, and the second communication circuit 108 is arranged to process signal components in a second frequency band which does not overlap the first frequency band. By way of example, but not limitation, the first frequency band may comply with one of the BT specification, the WLAN specification, the WIMAX specification, the GSM specification, the GNSS specification (e.g., the GPS specification), the WCDMA specification, and the DVB specification; in addition, the second frequency band may comply with the FM broadcast specification.

Figure 2:
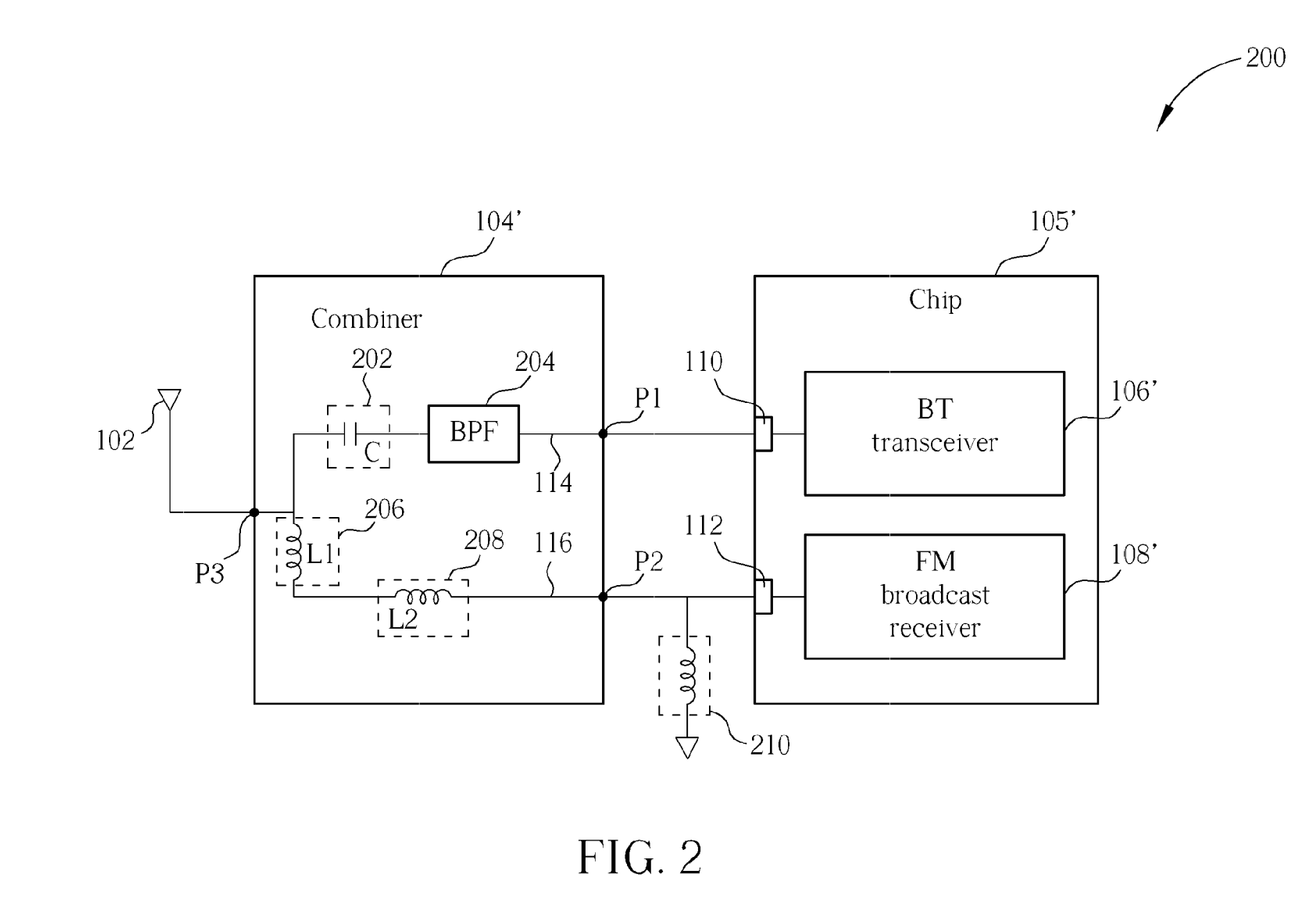
FIG. 2 is a diagram illustrating an exemplary wireless communication apparatus employing the hardware configuration shown in FIG. 1.

In a practical application, the second communication circuit 108 shown in FIG. 1 may be a receiver, and therefore only receives signals from the second port P2 of the combiner 104; besides, the first communication circuit 106 shown in FIG. 1 may be a transceiver which receives signals from the first port P1 of the combiner 104 and transmitting signals to the first port P1 of the combiner 104. Please refer to FIG. 2, which is a diagram illustrating an exemplary wireless communication apparatus employing the hardware configuration shown in FIG. 1. In this exemplary embodiment, the combiner 104' includes a first blocking element 202 and an optional band-pass filter (BPF) 204 placed on the first signal path 114, and at least one second blocking element placed on the second signal path 116. As shown in FIG. 2, two second blocking elements 206 and 208 placed on the second signal path 116 are connected in series. In addition, the chip 105' has a BT transceiver 106' which realizes the first communication circuit 106 shown in FIG. 1 and an FM broadcast receiver 108' which realizes the second communication circuit 108 shown in FIG. 1. Please note that the BT transceiver 106' arranged to process BT transmitting/received signals and the FM broadcast receiver 108' arranged to process FM broadcast (FM radio) received signals operate according to different wireless communication protocols, different impedance matching requirements, and different frequency bands. More specifically, the BT transceiver 106' processes BT transmitting/received signals according to a first wireless communication protocol (i.e., the BT protocol), and the FM broadcast receiver 108' processes received FM radio signals according to a second wireless communication protocol (i.e., the FM broadcast protocol); the BT transceiver 106' processes BT transmitting/received signals under an impedance matching requirement of a first impedance value such as around 50 Ohm, and the FM broadcast receiver 108' processes received FM radio signals under an impedance matching requirement of a second impedance value much greater than 50 Ohm; and the BT transceiver 106' processes BT transmitting/received signals in a first frequency band substantially equal to 2.402-2.480 GHz ISM band, and the FM broadcast receiver 108' processes received FM radio signals in a second frequency band with a center frequency substantially equal to 100 MHz.

The antenna 102 can be configured to have radiation properties suitable for either BT signals or FM signals (that is, the antenna 102 may be a BT antenna or an FM short antenna). As the signal transmission from the BT transceiver 106' to the antenna 102 may interfere with the signal reception of the FM broadcast receiver 108', the combiner 104' is therefore required to provide sufficient BT output power rejection, such as 42 dB isolation, to prevent the FM broadcast receiver 108' from being desensitized due to the BT signal transmission. In this exemplary embodiment, the first blocking element 202 is implemented for allowing signal components in the first frequency band (e.g., the BT band) to pass therethrough and for blocking or attenuating signal components in the second frequency band (e.g., the FM broadcast band) from passing therethrough; and each of the second blocking elements 206 and 208 is implemented for allowing the signal components in the second frequency band (e.g., the FM broadcast band) to pass therethrough and for blocking or attenuating the signal components in the first frequency band (e.g., the BT band) from passing therethrough. As shown in FIG. 2, the optional BPF 204 is disposed between the first blocking element 202 and the BT transceiver 106', and can be used for improving the signal quality of signals delivered via the first signal path 114. That is, the BPF 202 is capable of blocking or attenuating signal components of all frequencies except those in a pass band which at least overlaps the first frequency band (e.g., the BT band). Preferably, the pass band covers the complete first frequency band (e.g., the BT band) for optimum signal quality improvement. However, the BPF 202 is optional and may be omitted in an alternative embodiment of the present invention. This also obeys the spirit of the present invention.

The first blocking element 202 is implemented utilizing the high-pass or the band-pass circuits, and the second blocking element 206/208 is implemented utilizing the low-pass or the band-pass circuits. In this exemplary embodiment, the first blocking element 202 is implemented utilizing capacitor(s) only, and each of the second blocking elements 206 and 208 is implemented utilizing inductor(s) only. Thus, as the passive components can be used to realize the desired blocking elements, there is no need to use a special diplexer in the combiner 104'. The production cost is reduced accordingly.

As the BT band is far from the FM broadcast band, the first blocking element 202 may be simply implemented by a 10 pF capacitor C, and each of the second blocking elements 206 and 208 may be simply implemented by a 22 nH inductor L1/L2, where the 10 pF capacitor C provides a good bypass for the signal components in the BT band but high impedance for the signal components in the FM broadcast band, and the 22 nH inductor L1/L2 provides a good bypass for the signal components in the FM broadcast band but high impedance (e.g., a choke) for the signal components in the BT band.

It should be noted that two inductors L1 and L2, each having an inductance value of 22 nH, are implemented for high BT output power rejections as each of the inductors L1 and L2 has a resonant frequency approximately equal to 2.4 GHz. If a single indictor with a greater inductance value, say a 47 nH inductor, replaces the combination of two series-connected inductors L1 and L2, the resultant resonant frequency is approximately equal to 1.8 GHz instead of the desired 2.4 GHz, resulting in an unsatisfactory BT output power rejection. The use of two series-connected 22 nH inductors can effectively make FM broadcast receiver's sensitivity maintained at a desired level no matter whether the BT transceiver 106' is under the normal mode or the inquiry mode. In this way, the optimum FM broadcast reception performance can be achieved.

As mentioned above, the impedance matching requirement of the FM broadcast receiver 108' is to deliver signals via a high impedance path. Thus, an antenna matching element 210, such as one 120 nH inductor, may be implemented. However, this is for illustrative purposes only, and is not meant to be a limitation to the scope of the present invention.

Figure 3:
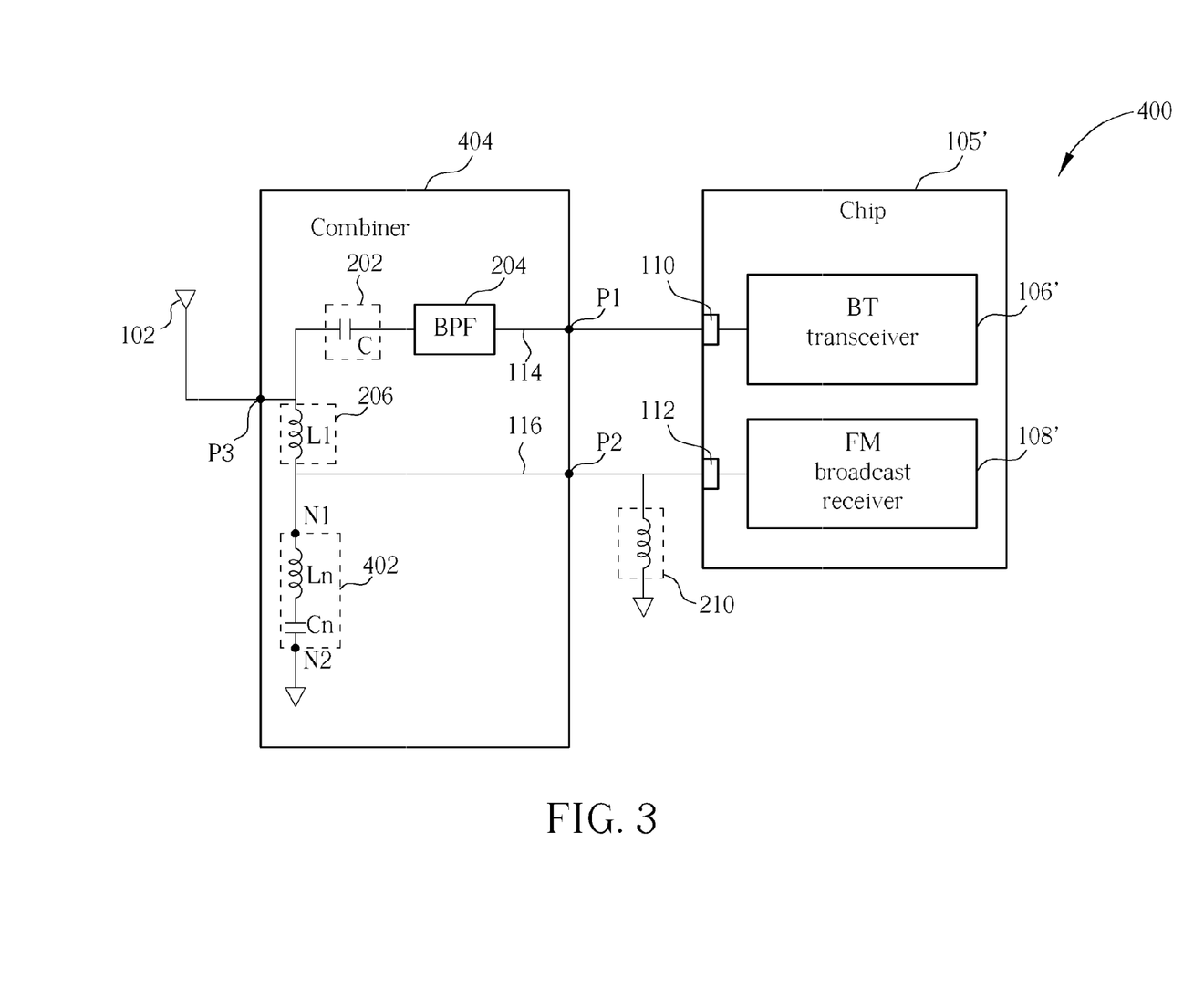
FIG. 3 is a diagram illustrating another exemplary wireless communication apparatus employing the hardware configuration shown in FIG. 1.

The inductors L1 and L2 require high inductance values to meet the requirements of the second blocking elements 206 and 208. However, inductors provided by different vendors may have variations in the inductance values. If the actual inductance value of each of the inductors L1 and L2 is deviated from the target value (e.g., 22 nH), the resonant frequency is deviated from the target value (e.g., 2.4 GHz). Thus, the resultant BT output power rejection performance is degraded. To avoid this, the present invention therefore proposes adding a notch filter to the combiner. Please refer to FIG. 3, which is a diagram illustrating another exemplary wireless communication apparatus employing the hardware configuration shown in FIG. 1. The wireless communication apparatus 400 is similar to the wireless communication apparatus 200 shown in FIG. 2. The major difference therebetween is that the combiner 404 further includes a notch filter 402. As shown in FIG. 3, the notch filter 402 has a first end N1 and a second end N2 coupled to the second port P2 and a reference voltage (e.g., a ground voltage), respectively. The notch filter 402 is devised for passing signal components of all frequencies except those in a stop band which at least overlaps the first frequency band (e.g., the BT band). Preferably, the stop band covers the complete first frequency band (e.g., the BT band).

In this exemplary embodiment, the notch filter 402 can be simply implemented using a small-sized indictor $L_n$ and a small-sized capacitor $C_n$. For example, the indictor $L_n$ has an inductance value equal to 2.2 nH and the capacitor $C_n$ has a capacitance value equal to 2.0 pF. As the inductance value required by the indictor $L_n$ and the capacitance value required by the capacitor $C_N$ are both small, the variations in capacitance values of inductors and inductance values of capacitors provided by different vendors become negligible. Thus, a robust 2.4 GHz notch filter 402 can be realized. More specifically, the characteristic of the notch filter 402 is substantially stable regardless of the vendors of the indictor $L_n$ and the capacitor $C_n$ used in the notch filter 402. It should be noted that using an LC circuit to realize the desired notch filter 402 is for illustrative purposes only. The notch filter 402 may be implemented using other notch filter architecture.

Figure 4:
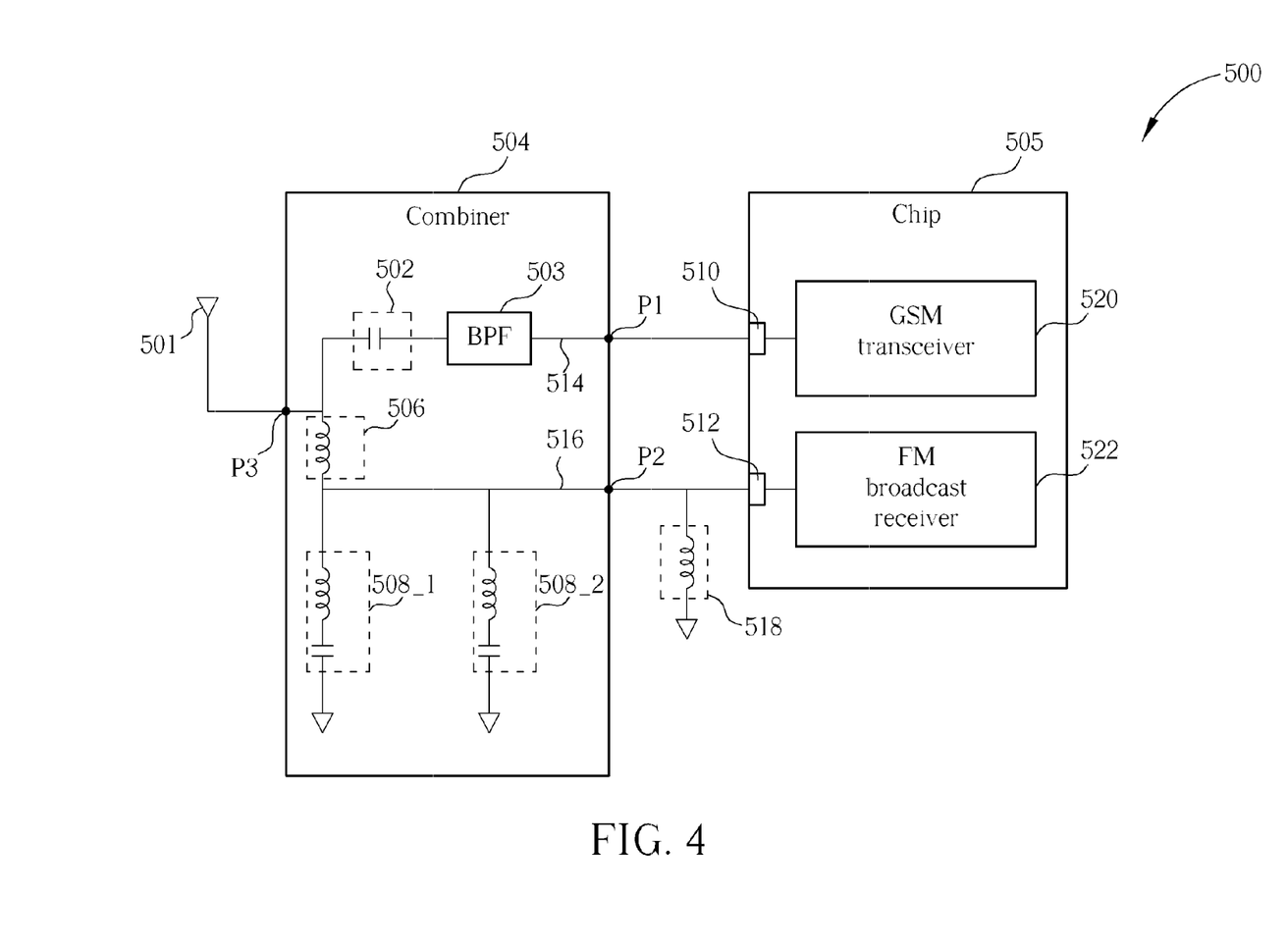
FIG. 4 is a diagram illustrating yet another exemplary wireless communication apparatus employing the hardware configuration shown in FIG. 1.
Figure 5:
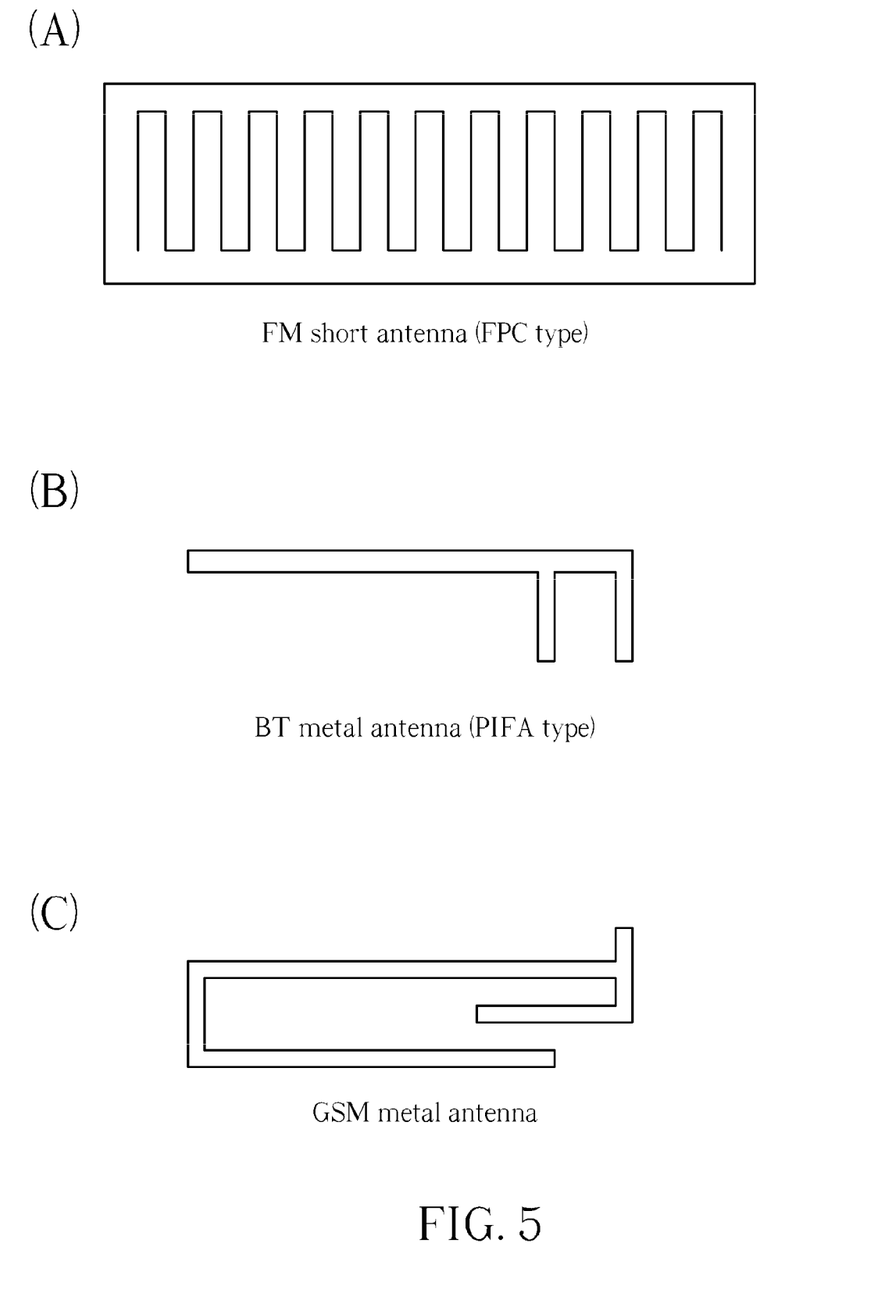
FIG. 5 is a diagram showing exemplary implementations of an antenna shared between different communication circuits.

In above exemplary embodiments, the FM broadcast receiver 108' may share a BT antenna used by the BT transceiver 106' for signal reception. However, it is possible that the BT communication function is not supported in certain cellular phones. However, the GSM communication function is essential to most of the cellular phones. Thus, the antenna sharing scheme can also be applied to a GSM antenna. Please refer to FIG. 4, which is a diagram illustrating yet another exemplary wireless communication apparatus employing the hardware configuration shown in FIG. 1. In this exemplary embodiment, the combiner 504 has a first port P1 coupled to a pin 510 of a chip 505, a second port P2 coupled to another pin 512 of the chip, and a third port P3 coupled to an antenna 501. As shown in FIG. 5, the combiner 504 includes a first blocking element 502 and an optional BPF 504 placed on a first signal path 514, one second blocking element 506 placed on a second signal path 516, and a plurality of notch filters 508_1 and 508_2 each coupled between the second port P2 and a reference voltage (e.g., a ground voltage). In addition, the chip 505 has a GSM transceiver 520 which realizes the first communication circuit 106 shown in FIG. 1 and an FM broadcast receiver 522 which realizes the second communication circuit 108 shown in FIG. 1. Please note that the GSM transceiver 520 arranged to process GSM transmitting/received signals and the FM broadcast receiver 522 arranged to process FM broadcast (FM radio) received signals operate according to different wireless communication protocols, different impedance matching requirements, and different frequency bands. More specifically, the GSM transceiver 520 processes GSM transmitting/received signals according to a first wireless communication protocol (e.g., the GSM protocol), and the FM broadcast receiver 522 processes received FM radio signals according to a second wireless communication protocol (e.g., the FM broadcast protocol); the GSM transceiver 520 processes GSM transmitting/received signals under an impedance matching requirement of a first impedance value such as 50 Ohm, and the FM broadcast receiver 522 processes received FM radio signals under an impedance matching requirement of a second impedance value much greater than 50 Ohm; and the GSM transceiver 520 processes GSM transmitting/received signals in a first frequency band with a center frequency substantially equal to 900 Mhz, and the FM broadcast receiver 522 processes received FM radio signals in a second frequency band with a center frequency substantially equal to 100 MHz. As mentioned above, the impedance matching requirement of the FM broadcast receiver 522 is to deliver signals via a high impedance path. Thus, an antenna matching element 518, such as an inductor, may be implemented.

The antenna 501 is implemented using a GSM antenna. In other words, the FM broadcast receiver 522 shares the GSM antenna used by the GSM transceiver 520 for signal reception. Compared to the exemplary wireless communication apparatuses 200 and 400, the exemplary wireless communication apparatus 500 can have better FM radio reception quality due to the fact that the GSM band is close to the FM broadcast band. However, it should be noted that the GSM output power is much higher than the BT output power. Using a single notch filter may not be sufficient for achieving a desired GSM output power rejection. The present invention therefore proposes using more than one LC-based notch filter in the combiner 504. However, this is for illustrative purposes only. In an alternative design, the combiner 504 may include only one notch filter if the single notch filter is particularly designed and is capable of providing a high GSM output power rejection. This also falls within the scope of the present invention.

As the GSM band is different from the BT band, the capacitive values of the capacitors and the inductance values of the inductors should be properly configured to meet the requirements of the wireless communication apparatus 500. Since a person skilled in the art can readily understand the operation of each element included in the exemplary wireless communication apparatus 500 after reading above paragraphs directed to aforementioned exemplary embodiments, further description is omitted here for brevity.

In above exemplary embodiments, the inductance value(s) and the capacitance value(s) are for illustrative purposes. That is, the inductance value(s) and the capacitance value(s) may be adjusted according to actual design consideration directed to sharing one antenna between different communication circuits. Moreover, part or all of the elements included in the combiner may be standalone elements or integrated in a single device by a particular manufacturing process (e.g., a Low Temperature Co-fired Ceramics (LTCC) process).

By way of example, but not limitation, the antenna 102 shared between the first communication circuit 106 and the second communication circuit 108 which is an RF broadcast receiver may be implemented using one of an FM short antenna (e.g., an antenna formed on a flexible printed circuit (FPC) as shown in sub-diagram (A) of FIG. 5), a BT metal antenna (e.g., a Planar Inverted-F Antenna (PIFA) as shown in sub-diagram (B) of FIG. 5), and a GSM metal antenna as shown in sub-diagram (C) of FIG. 5. It should be noted that using the BT antenna or the GSM antenna as the FM antenna can provide signal receiving capability even though characteristics may vary depending on the antenna size.

Moreover, the first communication circuit 106 and the second communication circuit 108 are not limited to be placed in a same chip 105. They may be separately placed in different chips. The present invention is also not limited to only two communication circuits. The above-mentioned combiner may be configured to provide three or more signal paths to multiple communication circuits. For example, a first blocking element can be placed between a shared antenna and a first communication circuit for allowing signal components in a first frequency band to pass therethrough and for blocking or attenuating signal components in a second and a third frequency bands in order to provide a first signal path; a second blocking element can be placed between the shared antenna and a second communication circuit for allowing signal components in the second frequency band to pass therethrough and for blocking or attenuating signal components in the first and third frequency bands in order to provide the second signal path; a third blocking element can be placed between the shared antenna and a third communication circuit for allowing signal components in the third frequency band to pass therethrough and for blocking or attenuating signal components in the first and second frequency bands in order to provide the third signal path.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:
1. A wireless communication apparatus, comprising:
a first communication circuit, arranged to process signals according to a first wireless communication protocol working at a first frequency band;
a second communication circuit, arranged to process signals according to a second wireless communication protocol working at a second frequency band, wherein the second wireless communication protocol is different from the first wireless communication protocol;
an antenna, shared between the first communication circuit and the second communication circuit; and
a combiner, having a first port coupled to the first communication circuit, a second port coupled to the second communication circuit, and a third port coupled to the antenna, the combiner comprising
a first blocking element placed between the third port and the first port for allowing signal components in the first frequency band to pass there through and for blocking or attenuating signal components in the second frequency band to provide a first signal path between the antenna and the first communication circuit; and
a second blocking element placed between the third port and the second port for allowing the signal components in the second frequency band to pass there through and for blocking or attenuating the signal components in the first frequency band to provide a second signal path between the antenna and the second communication circuit;

wherein the first blocking element comprises a capacitor, and the second blocking element comprises two inductors connected in series, wherein the first blocking element is implemented utilizing a high pass or band pass circuits, and the second blocking element is implemented utilizing a low pass or band pass circuits, and wherein the combiner further comprises at least one notch filter, having a first end and a second end respectively coupled to the second port and a reference voltage, for passing signal components of all frequencies except those in a stop band, wherein the stop band at least overlaps the first frequency band.

2. The wireless communication apparatus of claim 1, wherein the second wireless communication protocol complies with a frequency modulation (FM) broadcast specification.

3. The wireless communication apparatus of claim 2, wherein the first communication circuit is arranged to process one of a Bluetooth (BT) signal, a Wireless Local Area Network (WLAN) signal, a Worldwide Interoperability for Microwave Access (WIMAX) signal, a Global System for Mobile Communications (GSM) signal, a Global Navigation Satellite Systems (GNSS) signal, a Wideband Code Division Multiple Access (WCDMA) signal, and a Digital Video Broadcasting (DVB) signal.

4. A wireless communication apparatus, comprising:
a first communication circuit, arranged to perform a first communication operation under an impedance matching requirement of a first impedance value;
a second communication circuit, arranged to perform a second communication operation under an impedance matching requirement of a second impedance value, wherein the first impedance value is around 50 Ohm and the second impedance value is higher than the first impedance value;
an antenna, shared between the first communication circuit and the second communication circuit; and
a combiner, having a first port coupled to the first communication circuit, a second port coupled to the second communication circuit, and a third port coupled to the antenna, for providing a first signal path between the first port and the third port and a second signal path between the second port and the third port;
wherein the combiner comprises:
a first blocking element, placed on the first signal path, for allowing the signal components in the first frequency band to pass there through and for blocking or attenuating the signal components in the second frequency band from passing there through;
and at least a second blocking element, placed on the second signal path, for allowing the signal components in the second frequency band to pass there through and for blocking or attenuating the signal components in the first frequency band from passing there through,
wherein the first blocking element comprises a capacitor, and the second blocking element comprises two inductors connected in series,
wherein the first blocking element is implemented utilizing a high pass or band pass circuits, and the second blocking element is implemented utilizing a low pass or band pass circuits, and wherein the combiner further comprises at least one notch filter, having a first end and a second end respectively coupled to the second port and a reference voltage, for passing signal components of all frequencies except those in a stop band, wherein the stop band at least overlaps the first frequency band.

5. The wireless communication apparatus of claim 4, wherein the second impedance value complies with a frequency modulation (FM) broadcast specification.

6. The wireless communication apparatus of claim 4, wherein the first communication circuit is arranged to process one of a Bluetooth (BT) signal, a Wireless Local Area Network (WLAN) signal, a Worldwide Interoperability for Microwave Access (WIMAX) signal, a Global System for Mobile Communications (GSM) signal, a Global Positioning System (GPS) signal, a Wideband Code Division Multiple Access (WCDMA) signal, and a Digital Video Broadcasting (DVB) signal.

7. The wireless communication apparatus of claim 4, wherein the first communication operation is performed to process signal components in the first frequency band, and the second communication operation is performed to process signal components in the second frequency band different from the first frequency band.

8. A wireless communication apparatus, comprising:
a first communication circuit, arranged to process signal components in a first frequency band;
a second communication circuit, arranged to process signal components in a second frequency band, wherein the second frequency band does not overlap the first frequency band;
an antenna, shared between the first communication circuit and the second communication circuit; and
a combiner, having a first port coupled to the first communication circuit, a second port coupled to the second communication circuit, and a third port coupled to the antenna, for providing a first signal path between the first port and the third port and a second signal path between the second port and the third port
wherein the combiner comprises:
a first blocking element, placed on the first signal path, for allowing the signal components in the first frequency band to pass there through and for blocking or attenuating the signal components in the second frequency band from passing there through; and
at least a second blocking element, placed on the second signal path, for allowing the signal components in the second frequency band to pass there through and for blocking or attenuating the signal components in the first frequency band from passing there through;
wherein the first blocking element comprises a capacitor, and the second blocking element comprises two inductors connected in series,
wherein the first blocking element is implemented utilizing a high pass or band pass circuits, and the second blocking element is implemented utilizing a low pass or band pass circuits, and wherein the combiner further comprises at least one notch filter, having a first end and a second end respectively coupled to the second port and a reference voltage, for passing signal components of all frequencies except those in a stop band, wherein the stop band at least overlaps the first frequency band.

* * * * *